(12) United States Patent
Lu

(10) Patent No.: US 8,231,088 B2
(45) Date of Patent: Jul. 31, 2012

(54) INTEGRATIVE THREE-SEGMENT TRIPOD

(75) Inventor: Weiming Lu, Ningbo (CN)

(73) Assignee: Ningbo Weifeng Image Equipment Group Co., Ltd., Ningbo, Zhejiang Province (CN)

( * ) Notice: Subject to any disclaimer, the term of this patent is extended or adjusted under 35 U.S.C. 154(b) by 266 days.

(21) Appl. No.: 12/419,433

(22) Filed: Apr. 7, 2009

(65) Prior Publication Data

US 2010/0064739 A1 Mar. 18, 2010

(30) Foreign Application Priority Data

Sep. 18, 2008 (CN) .......................... 2008 1 0120817

(51) Int. Cl.
*F16M 11/38* (2006.01)
(52) U.S. Cl. .................. 248/168; 248/163.1; 248/176.3; 248/188.5
(58) Field of Classification Search ............... 248/163.1, 248/168, 170, 177.1, 187.1, 188, 188.2, 188.5, 248/188.6, 188.8, 176.3, 1, 440, 411, 222.13, 248/229.11, 229.21, 178; 396/420, 421, 396/428; 403/109.5
See application file for complete search history.

(56) References Cited

U.S. PATENT DOCUMENTS

| 4,015,806 | A | * | 4/1977 | Cattermole | .................... 248/168 |
| 4,767,090 | A | * | 8/1988 | Hartman et al. | ............... 248/168 |
| 5,320,316 | A | * | 6/1994 | Baker | ......................... 248/163.1 |
| 5,887,835 | A | | 3/1999 | Hein et al. | |
| 6,702,482 | B2 | * | 3/2004 | Sherwin | .......................... 396/428 |
| 6,942,187 | B2 | * | 9/2005 | Blackburn | ................. 248/163.1 |
| 7,543,784 | B2 | * | 6/2009 | Lindsay | ......................... 248/168 |
| 2004/0129843 | A1 | | 7/2004 | Pernstich et al. | |

FOREIGN PATENT DOCUMENTS

| CN | 1444709 A | 9/2003 |
| CN | 201107535 Y | 8/2008 |
| JP | 2004-286231 A | 10/2004 |

* cited by examiner

*Primary Examiner* — Tan Le
(74) *Attorney, Agent, or Firm* — Panitch Schwarze Belisario & Nadel LLP

(57) ABSTRACT

The invention relates to an integrative three-segment tripod. The tripod has a main bracket and at least one stand leg having an upper segment, a middle segment and a lower segment. The upper segment, the middle segment, and the lower segment are each telescopically connected together. The stand leg further includes a locking unit and a safety device. The locking unit fixes the middle segment to the upper segment and simultaneously fixes the lower segment to the middle segment. The safety device is associated with the locking unit and keeps the locking unit in the fixing state when the locking unit is in the locking position. Therefore, each stand leg of the tripod can be controlled easily by a single locking unit, and the safety device prevents the rotation lever from inadvertent release.

10 Claims, 4 Drawing Sheets

INTEGRATIVE THREE-SEGMENT TRIPOD

TECHNICAL FIELD

The invention relates to an integrative three-segment tripod in the field of photographic accessories.

BACKGROUND ART

While taking pictures or shooting a film, a camera or Digital Video (DV) is generally supported by a tripod through which shooting angle, height and balance can be adjusted. In most of tripods, the adjustments are achieved by telescopic stand legs which are controlled by locking units for their leg tubes. Due to different designs, most of the tripods have different locking units. However, the tripods of this kind are generally provided with a plurality of locking units which need to be locked simultaneously to fix the multistage leg tubes. Without a safety device, the locking units may be released by accident after the angle and the height of the tripods were fixed. Thus, the relative sliding between the leg tubs may lead to changes of angle and height, even damages of the photographic equipments.

SUMMARY OF THE INVENTION

It is an object of the present invention to provide an integrative three-segment tripod that can be adjusted easily with each stand legs controlled by only one locking unit and can be operated safely.

The foregoing objects are attained by the tripod according to the present invention. The tripod has a main bracket and at least one stand leg, each stand leg including an upper segment, an middle segment and an lower segment, the upper segment is connected to the main bracket, the middle segment is telescopically connected to the upper segment, and the lower segment is telescopically connected to the middle segment, wherein the stand leg further includes a locking unit and a safety device, the locking unit is provided at the joints where the middle segment is joined to the upper segment and the lower segment, and can fix the middle segment to the upper segment and simultaneously fix the lower segment to the middle segment, and the safety device is associated with the locking unit, which can keep the locking unit in the fixing state when the locking unit is in the locking position.

In the tripod of present invention, since all the segments of a stand leg can be fixed together simultaneously with a single rotation lever of the locking unit, the tripod can be adjusted easily; and with the help of the safety device, the locking unit can not be released indeliberately and thus operates safely.

Still other aspects of the present invention will become readily apparent to those skilled in the art from the following description wherein there is shown and described a preferred embodiment of this invention, simply by way of illustration of one of the best modes best suited for to carry out the invention. As it will be realized, the present invention is capable of other different embodiments and its several details are capable of modifications in various obvious aspects all without deviating from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description server to explain the principals of the invention. In the drawings.

DETAILED DESCRIPTION OF THE PREFERRED EMBODIMENT

Figure 1:
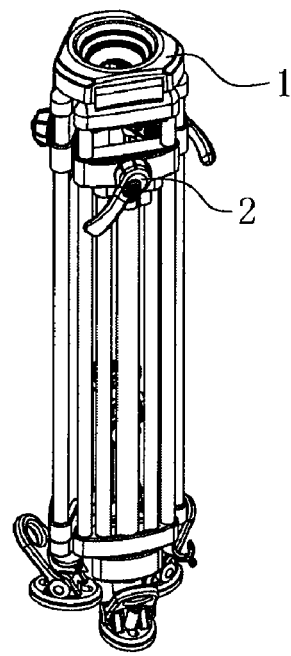
FIG. 1 is a diagram of the tripod in the folded state in accordance with the present invention.
Figure 2:
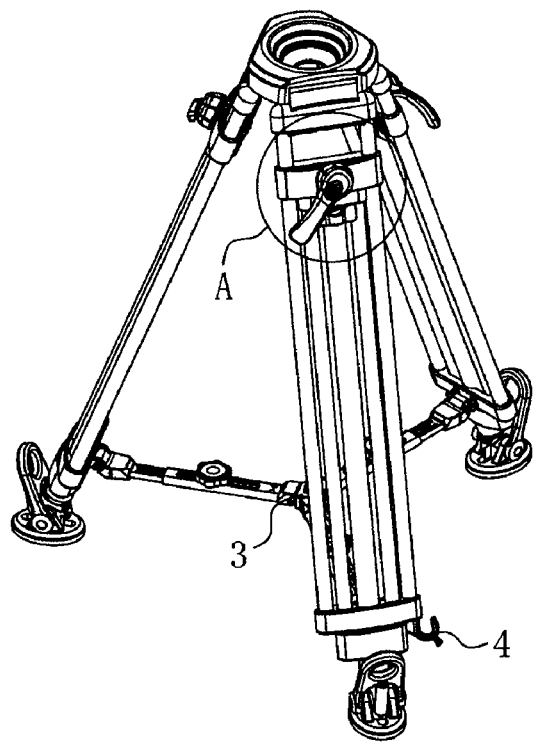
FIG. 2 a diagram of the tripod in the expanded state in accordance with the present invention.

FIGS. 1 and 2 show a tripod in the folded state and the expanded state, respectively. It can be seen that, the main bracket 1 is connected with three stand legs at their top ends, and each leg pivots about an axis on the main bracket 1 so as to transform the tripod between the folded state and expanded state. The middle connector 3 is used for controlling the expanding angle of the tripod, and a rotation lever 2 is provided on each leg for controlling the length of extension. A telescopic hook (4) is set on one leg, when the whole tripod is shrunk, the hook (4) can be pulled out and enlaced surround the tripod legs together, it will avoid the legs dispersing when moving.

Figure 3:
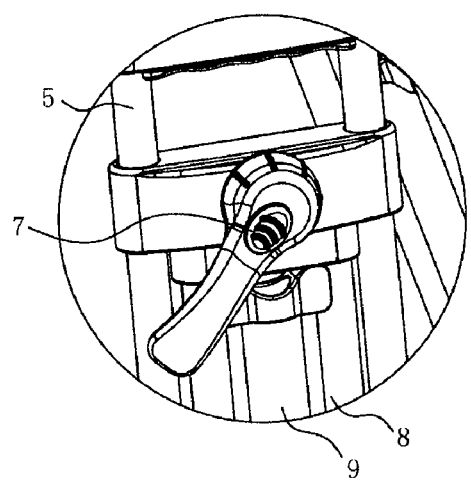
FIG. 3 is an enlarged view of portion A in FIG. 2.

FIG. 3 shows an enlarged view of portion A in FIG. 2, and it can be seen that a rotation lever 2 is provided for controlling two cylindrical upper leg tubes 5, two cylindrical middle leg tubes 8 and a cylindrical lower leg tube 9.

Figure 4:
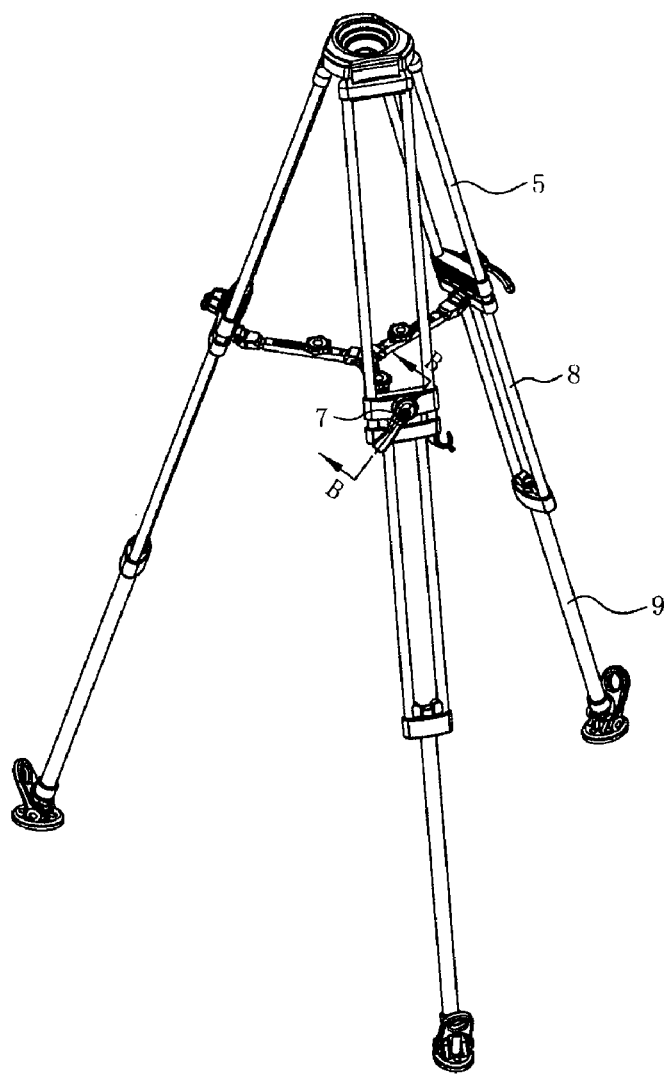
FIG. 4 is a diagram of the tripod in the completely extended and expanded state in accordance with the present invention.

FIG. 4 shows a tripod in the completely extended and expanded state in accordance with the present invention, in which the middle leg tubes 8 and the lower leg tube 9 are completely extended and the stand leg reach its maximal length.

Figure 5:
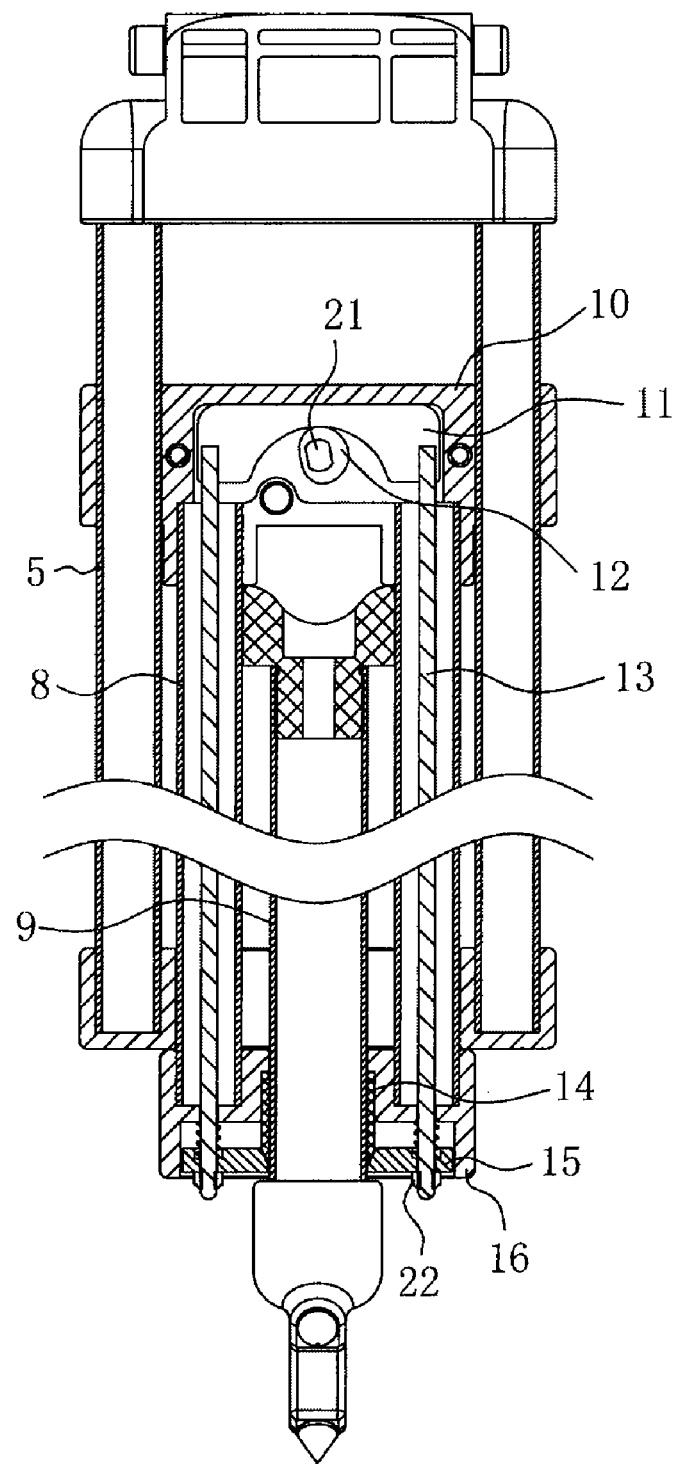
FIG. 5 is a cutaway view of a stand leg of the tripod in the direction along which the leg extends in accordance with the present invention.

FIG. 5 shows a cutaway view of a stand leg of the tripod in the direction along which the leg extends in accordance with the present invention. The stand leg includes an upper segment, a middle segment and a lower segment. Further, the upper segment includes two upper leg tubes 5, the lower segment includes a lower leg tube 9, and the middle segment includes a movable connector 10, a lower connector 16 and two middle leg tubes 8 connected there between; furthermore, the movable connector 10 is slidable along the upper leg tubes 5, the lower leg tube 9 passes through the lower connector 16. Such an arrangement forms a telescopic connection between the middle segment and the upper segment as well as between the lower segment and the middle segment. It can be seen from FIG. 5 that, limiting members is also provided at the ends of the upper leg tubes 5 and the lower leg tube 9 to keep the middle segment and the lower segment within proper ranges while extending or retracting.

Figure 6:
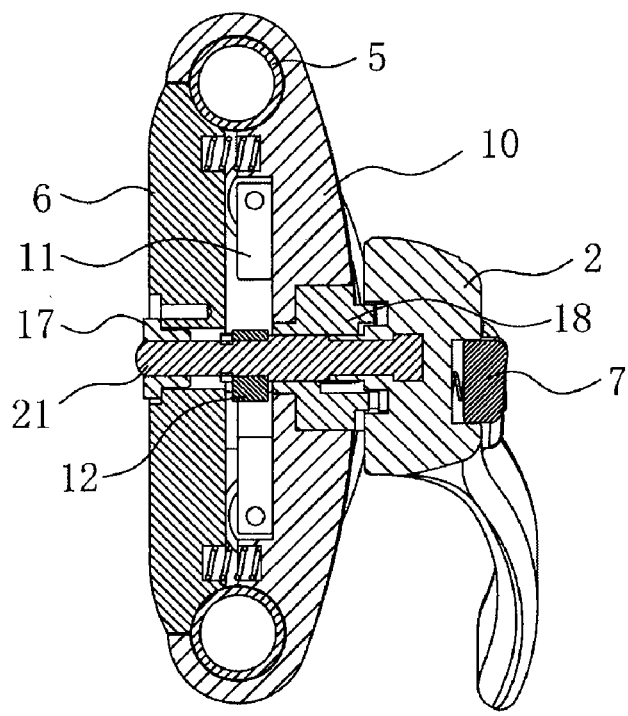
FIG. 6 is a cross-section view of portion A in FIG. 2.

The locking unit is provided at the joints where the middle segment is joined to the upper segment and the lower segment, and further includes a rotation lever 2, a locking screw 21, a position adjustor 18, a cam 12, a clamping piece 6, a first nut 17, a cam blocker 11, two connecting rods 13, a locking ring 14, a pressing piece 15 and two second nuts 22, as shown in FIGS. 5 and 6. The locking screw 21 passes through the position adjustor 18, the movable connector 10, the cam 12 and the clamping piece 6, is connected securely at one end to the rotation lever 2 provided at the outer side of the movable connector 10, and is connected to the clamping piece 6 at the other end by the first nut 17.

The surface of the position adjustor 18 facing to the rotation lever 2 gradually rises along the circumferential inclined plane direction, while being rotated the rotation lever 2 is simultaneously risen from low to high by the circumferential inclined plane surface of the position adjustor 18, which in turn drives the clamping piece 6 to move in the same direction and gradually come close to the upper leg tubes 5, and thus in conjunction with the movable connector 10, the clamping piece 6 locks the upper leg tubes 5 and fixes it in position.

As also shown in FIG. 6, the movable connector 10 and the clamping piece 6 are made corresponding grooves in which return springs are provided. The clamping piece 6 is kept out of contact with the upper leg tubes 5 by the elasticity of the return springs when not being driven by the locking screw 21.

As shown in FIG. 5, the cam blocker 11 in the movable connector 10 and the pressing piece 15 in the lower connector 16 are connected together by the connecting rods 13 which are located in the middle leg tubes 8. The connecting rods 13 pass through the lower connector 16 and the pressing piece 15, and are connected to the pressing piece 15 by the second nuts 22. The cam blocker 11 is in contact with the cam 12 and is thus driven to move in the direction towards the main bracket 1 when the eccentricity of the cam 12 is increased due to the rotation of the cam 12, the pressing piece 15 is in turn driven by the connecting rods 13. The locking ring 14 is located in the lower connector 16 and surrounds the lower leg tube 9, and when being moved along with the connecting rods 13, the pressing piece 15 presses the locking ring 14 so that the locking ring 14 is deformed to grip the lower leg tube 9 firmly and thus fixes the lower leg tube 9.

It can also be seen from FIG. 5 that, return springs are provided between the lower connector 16 and the pressing piece 15 and surround the connecting rods 13 so as to keep the pressing piece 15 out of contact with the locking ring 14 when not being driven by the connecting rods 13.

Figure 7:
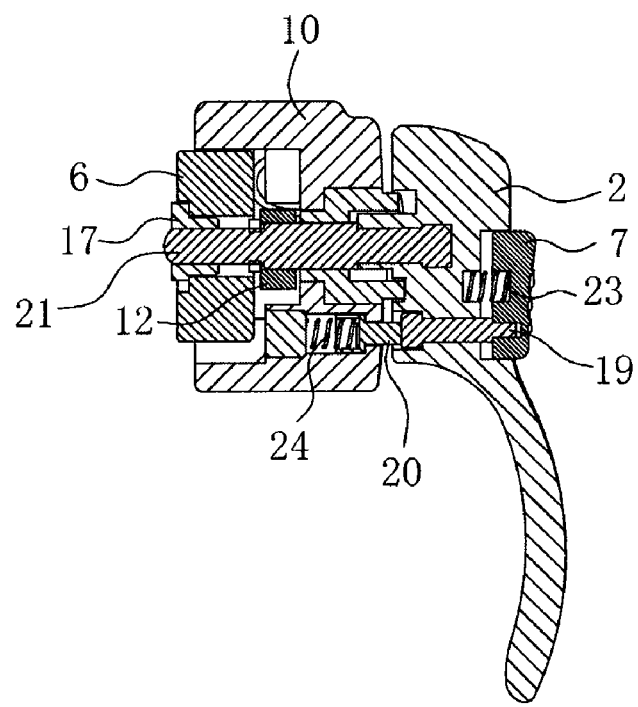
FIG. 7 is a cross-section view along the direction of B-B in FIG. 4, showing the structure of the safety device in accordance with the present invention.

FIG. 7 shows the structure of the safety device of the tripod in accordance with the present invention. The safety device further includes a button 7, a stop rod 20, a pushing rod, a first spring 23 and a second spring 24, the stop rod 20 is located in an anchor-hole in the movable connector 10, under the action of the second spring 24 one of the ends of the stop rod 20 can protrude from the opening of the hole in the surface of the movable connector 10 facing to the rotation lever 2. When the rotation lever 2 is rotated into the locking position, the protruded end of the stop rod 20 is forced into a corresponding retaining hole in the rotation lever 2 and thus locks the rotation lever 2.

The button 7 is partly provided into a groove in the outer surface of the rotation lever 2, which can be pushed down in the substantively perpendicular direction of the surface and return the initial position under the action of the first spring 23. The pushing rod is provided in the retaining hole with one end connected to the button 7, and the other end of the pushing rod can reach at least the position flush with the opening of the retaining hole as the button 7 is pushed down, therefore the stop rod 20 is pushed out of the retaining hole by the pushing rod and the rotation lever 2 is released from locking.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

LIST OF THE ELEMENTS

The name of elements and their corresponding reference signs used in the Description and Drawings are listed below:

| Main bracket | 1 |
| --- | --- |
| rotation lever | 2 |
| Middle connector | 3 |
| hook | 4 |
| Upper leg tube | 5 |
| clamping piece | 6 |
| Button | 7 |
| middle leg tube | 8 |
| Lower leg tube | 9 |
| movable connector | 10 |
| Cam blocker | 11 |
| cam | 12 |
| Connecting rod | 13 |
| locking ring | 14 |
| Pressing piece | 15 |
| lower connector | 16 |
| First nut | 17 |
| position adjustor | 18 |
| Pushing rod | 19 |
| stop rod | 20 |
| Locking screw | 21 |
| second nut | 22 |
| First spring | 23 |
| second spring | 24 |

The invention claimed is:

1. A tripod having
a main bracket (1) and
at least one stand leg, each stand leg including
an upper segment, a middle segment and a lower segment, the upper segment is connected to the main bracket (1), the middle segment is telescopically connected to the upper segment at a first joint, the lower segment is telescopically connected to the middle segment at a second joint, the upper segment including at least an upper leg tube (5), the lower segment including a lower leg tube (9), and the middle segment including a movable connector (10), a lower connector (16) and at least one middle leg tube (8) connected there between, the movable connector (10) is slidable along the upper leg tube (5) and the lower leg tube (9) passes through the lower connector (16)
a locking unit provided at the first and second joints and configured to simultaneously fix the lower segment to the middle segment and the middle segment to the upper segment, the locking unit includes a rotation lever (2), a locking screw (21), a position adjustor (18), a cam (12) and a clamping piece (6), the rotation lever (2) is provided at the outer side of the movable connector (10), the locking screw (21) passes through the position adjustor (18), the movable connector (10), the cam (12) and the clamping piece (6), and is connected securely to the rotation lever (2) at its one end and is connected to the clamping piece (6) at the other end; the surface of the position adjustor (18) facing to the rotation lever (2) gradually rises along the circumferential inclined plane direction, while being rotated the rotation lever (2) is simultaneously risen from low to high by the circumferential inclined plane surface of the position adjustor (18), which in turn drives the clamping piece (6) to move in the same direction, and thus the clamping piece (6) gradually comes close to the upper leg tube (5) passing through the movable connector (10) and locks the upper leg tube (5) in position eventually; and a safety device operatively connected to the locking unit, the safety device having a stop rod that engages the locking unit and is moveable between an engaged position and a disengaged position when the locking unit is in a locking position, wherein in the engaged position the locking unit is locked from moving to an unlocking position.

2. A tripod according to claim 1, wherein a return spring is provided between the movable connector (10) and the clamping piece (6) so as to keep the clamping piece (6) out of contact with the upper leg tube (5) when not being driven by the locking screw (21).

3. A tripod according to claim 1, wherein the locking unit further includes a cam blocker (11), at least a connecting rod (13), a locking ring (14) and a pressing piece (15), the cam blocker (11) is located in the movable connector (10), the pressing piece (15) is located in the lower connector (16), and the cam blocker (11) and the pressing piece (15) are connected together by the connecting rod (13); the cam blocker (11) is in contact with the cam (12) and is thus driven to move in the direction towards the main bracket 1 when the eccentricity of the cam (12) is increased due to the rotation of the cam (12), the pressing piece (15) is in turn driven by the connecting rod (13) in the same direction; the locking ring (14) is located in the lower connector (16) and surrounds the lower leg tube (9), when being moved along with the connecting rod (13), the pressing piece (15) presses the locking ring (14) so that the locking ring (14) is deformed to grip the lower leg tube (9) firmly and thus fixes the lower leg tube (9).

4. A tripod according to claim 3, wherein the connecting rod (13) is located in the middle leg tube (8) and passes through the lower connector (16) and the pressing piece (15).

5. A tripod according to claim 4, wherein a return spring is provided between the lower connector (16) and the pressing piece (15) and surrounds the connecting rod (13) so as to keep the pressing piece (15) out of contact with the locking ring (14) when not being driven by the connecting rod (13).

6. A tripod according to claim 1, wherein the safety device further includes a button (7), a pushing rod, a first spring (23) and a second spring (24), the stop rod (20) is located in an anchor-hole in the movable connector (10), under the action of the second spring (24) one of the ends of the stop rod (20) can protrude from the opening of the hole in the surface of the movable connector (10) facing to the rotation lever (2); when the rotation lever (2) is rotated to the locking position, the protruded end of the stop rod (20) is forced into a corresponding retaining hole in the rotation lever (2) and thus locks the rotation lever (2); the button (7) is provided onto the outer surface of the rotation lever (2), which can be pushed down in the substantively perpendicular direction of the surface and return the initial position under the action of the first spring (23); the pushing rod is provided in the retaining hole with one end connected to the button (7), and the other end of the pushing rod can reach at least the position flush with the opening of the retaining hole as the button (7) is pushed down, therefore the stop rod (20) is pushed out of the retaining hole by the pushing rod and the rotation lever (2) is released from locking.

7. A tripod according to claim 2, wherein the safety device further includes a button (7), a pushing rod, a first spring (23) and a second spring (24), and wherein the stop rod (20) is located in an anchor-hole in the movable connector (10), under the action of the second spring (24) one of the ends of the stop rod (20) can protrude from the opening of the hole in the surface of the movable connector (10) facing to the rotation lever (2); when the rotation lever (2) is rotated to the locking position, the protruded end of the stop rod (20) is forced into a corresponding retaining hole in the rotation lever (2) and thus locks the rotation lever (2); the button (7) is provided onto the outer surface of the rotation lever (2), which can be pushed down in the substantively perpendicular direction of the surface and return the initial position under the action of the first spring (23); the pushing rod is provided in the retaining hole with one end connected to the button (7), and the other end of the pushing rod can reach at least the position flush with the opening of the retaining hole as the button (7) is pushed down, therefore the stop rod (20) is pushed out of the retaining hole by the pushing rod and the rotation lever (2) is released from locking.

8. A tripod according to claim 3, wherein the safety device further includes a button (7), a pushing rod, a first spring (23) and a second spring (24), and wherein the stop rod (20) is located in an anchor-hole in the movable connector (10), under the action of the second spring (24) one of the ends of the stop rod (20) can protrude from the opening of the hole in the surface of the movable connector (10) facing to the rotation lever (2); when the rotation lever (2) is rotated to the locking position, the protruded end of the stop rod (20) is forced into a corresponding retaining hole in the rotation lever (2) and thus locks the rotation lever (2); the button (7) is provided onto the outer surface of the rotation lever (2), which can be pushed down in the substantively perpendicular direction of the surface and return the initial position under the action of the first spring (23); the pushing rod is provided in the retaining hole with one end connected to the button (7), and the other end of the pushing rod can reach at least the position flush with the opening of the retaining hole as the button (7) is pushed down, therefore the stop rod (20) is pushed out of the retaining hole by the pushing rod and the rotation lever (2) is released from locking.

9. A tripod according to claim 4, wherein the safety device further includes a button (7), a pushing rod, a first spring (23) and a second spring (24), and wherein the stop rod (20) is located in an anchor-hole in the movable connector (10), under the action of the second spring (24) one of the ends of the stop rod (20) can protrude from the opening of the hole in the surface of the movable connector (10) facing to the rotation lever (2); when the rotation lever (2) is rotated to the locking position, the protruded end of the stop rod (20) is forced into a corresponding retaining hole in the rotation lever (2) and thus locks the rotation lever (2); the button (7) is provided onto the outer surface of the rotation lever (2), which can be pushed down in the substantively perpendicular direction of the surface and return the initial position under the action of the first spring (23); the pushing rod is provided in the retaining hole with one end connected to the button (7), and the other end of the pushing rod can reach at least the position flush with the opening of the retaining hole as the button (7) is pushed down, therefore the stop rod (20) is pushed out of the retaining hole by the pushing rod and the rotation lever (2) is released from locking.

10. A tripod according to claim 5, wherein the safety device further includes a button (7), a pushing rod, a first spring (23) and a second spring (24), and wherein the stop rod (20) is located in an anchor-hole in the movable connector (10), under the action of the second spring (24) one of the ends of the stop rod (20) can protrude from the opening of the hole in the surface of the movable connector (10) facing to the rotation lever (2); when the rotation lever (2) is rotated to the locking position, the protruded end of the stop rod (20) is forced into a corresponding retaining hole in the rotation lever (2) and thus locks the rotation lever (2); the button (7) is provided onto the outer surface of the rotation lever (2), which can be pushed down in the substantively perpendicular direction of the surface and return the initial position under the action of the first spring (23); the pushing rod is provided in the retaining hole with one end connected to the button (7), and the other end of the pushing rod can reach at least the position flush with the opening of the retaining hole as the button (7) is pushed down, therefore the stop rod (20) is pushed out of the retaining hole by the pushing rod and the rotation lever (2) is released from locking.

* * * * *